July 19, 1955     E. O. SEAVER     2,713,243

ROCKET AND TURBINE ENGINE COMBINATION FOR AIRCRAFT

Filed Oct. 23, 1946     2 Sheets—Sheet 1

Inventor
Elliot O. Seaver
By Godfrey B. Speir
Attorney

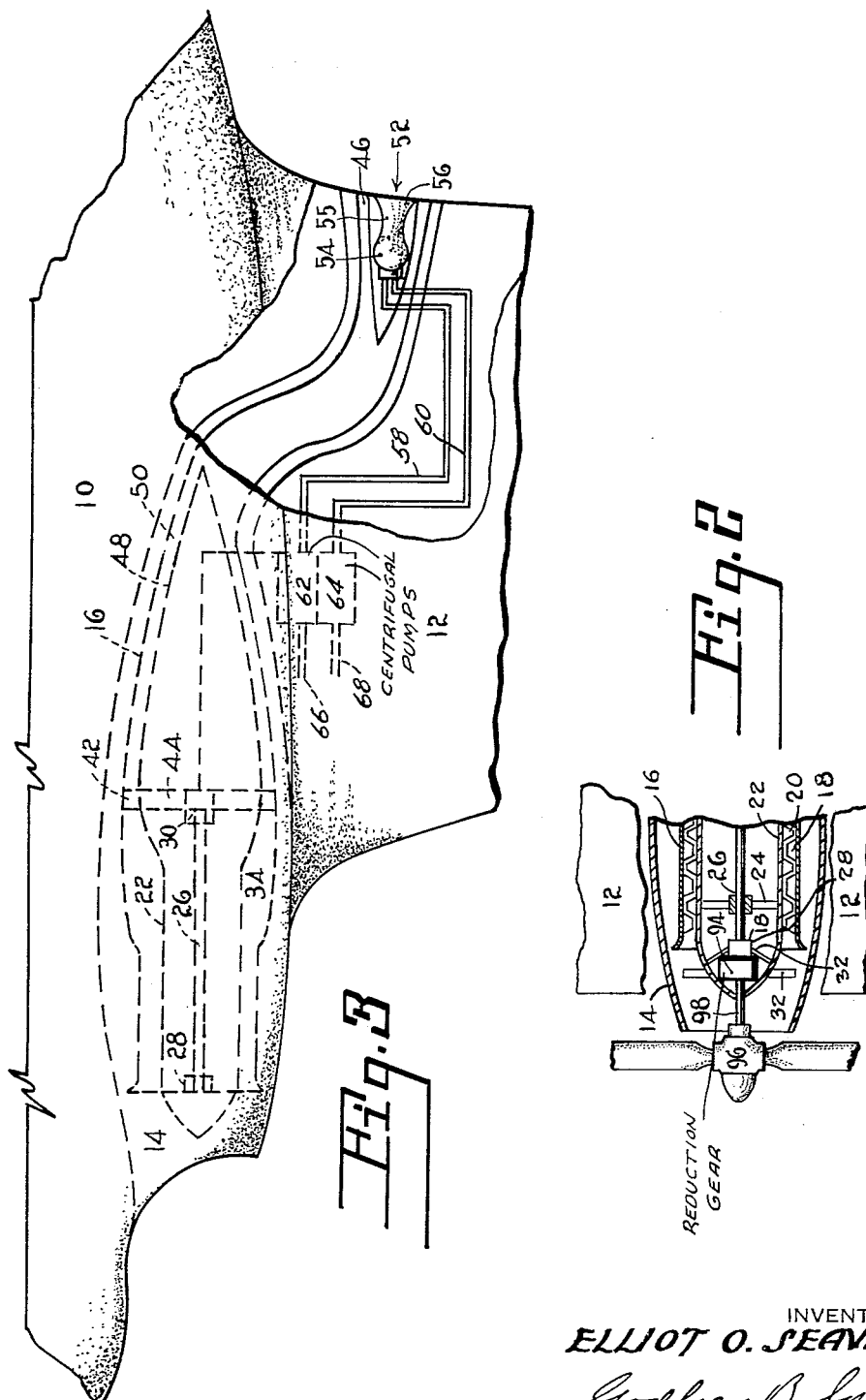

United States Patent Office 2,713,243
Patented July 19, 1955

2,713,243

ROCKET AND TURBINE ENGINE COMBINATION FOR AIRCRAFT

Elliott O. Seaver, Caldwell, N. J., assignor to Curtiss-Wright Corporation, a corporation of Delaware Application October 23, 1946, Serial No. 705,141

6 Claims. (Cl. 60—35.6)

This invention relates to power plants of the type wherein propulsive force is secured by jet reaction. More particularly, the invention is concerned with a combination of gas turbines and rocket motors applicable for use on aircraft.

It is an object of this invention to provide a combined power plant producing propulsion by jet reaction and utilizing both rocket and turbo-jet engines. A further object of the invention is to combine the rocket and turbo-jet power units in the same major engine assembly. Still another object of the invention is to provide means, driven by a turbo-jet engine, which will supply fuels to a rocket motor. A further object of the invention is to so dispose a rocket motor in a turbo-jet engine as to produce coaxial thrust axes for the jets of both the turbo-jet engine and the rocket motor. Still another object is to provide a combined turbo-jet and rocket aircraft power plant in a single unit, in such fashion that aircraft drag may be materially reduced over the drag which would be occasioned if the turbo-jet engine and the rocket motors were divorced from one another or carried as separate entities.

The above objects are accomplished by the structure and arrangements set forth in the following detailed description when read in connection with the accompanying drawings. It is to be expressly understood that the drawings are employed for purpose of illustration only and are not designed as a definition of the limits of the invention, reference being had to the appended claims for this purpose.

Fig. 2 represents a longitudinal section of a power plant as shown in Fig. 1, with the addition of a propeller and its components; and Fig. 3 represents a longitudinal view of a power plant with an alternative arrangement of the invention.

Figure 1:
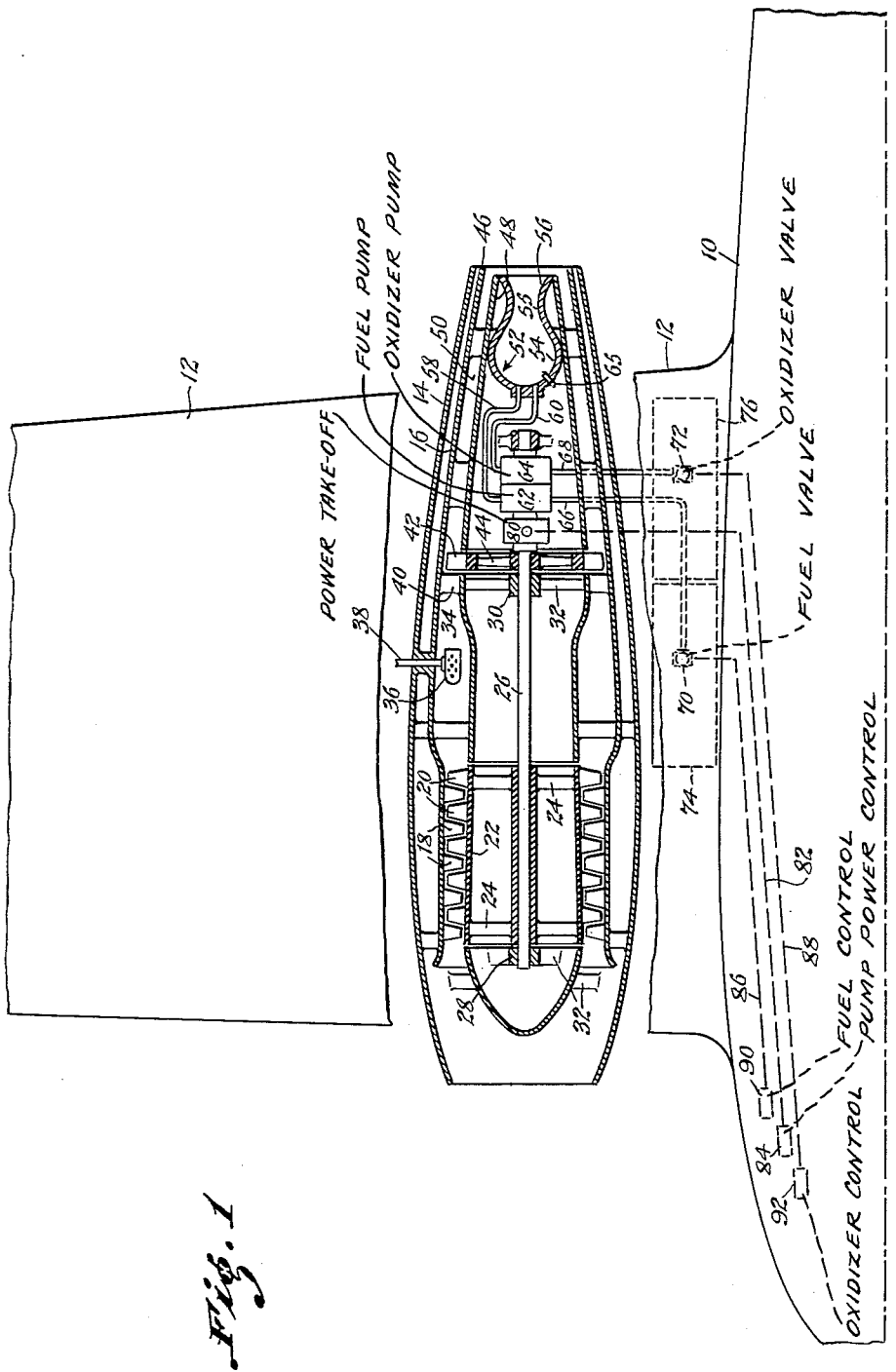
Figure 1 represents a longitudinal section of a power plant incorporating the features of the invention, associated with an aircraft which is shown in part.

Reference may be made in Figs. 1 and 3, in which 10 represents an aircraft fuselage of streamlined configuration to the side of which a wing 12 is secured by appropriate means. Upon this wing is secured by means well known in the art, a streamlined nacelle 14 containing the power plant arrangement of the invention. Within the nacelle is a housing 16 having stator compressor vanes 18 annularly arranged and in plural rows. Between the rows of these vanes rotary compressor vanes 20 are disposed in a plurality of annular rows, the latter vanes being carried by a drum 22 mounted through suitable webs or the like 24 on a shaft 26, the shaft being carried in bearings 28 and 30 rigidly secured to the housing 16 and the nacelle 14 by struts 32. Rearwardly of the compressor 18, 20 is an annular combustion space 34 having one or more combustion units such as 36 disposed therein, the latter being fed with fuel through a pipe such as 38. The combustion units likewise incorporate suitable ignition means. The combustion space 34 leads to an annular nozzle box 40 which delivers combustion products against the blades 42 of a turbine wheel 44. As is well known, after the rotor system, including the elements 26, 22, 20, 44 and 42 is brought up to a certain speed by starting apparatus, fuel is admitted to the chamber 36 and mixed with air delivered by the compressor and then ignited. The resulting combustion gases enforce rotation of the turbine wheel 44 so that the rotor system will be sustained in rotation at high speed. Only a part of the combustion energy is utilized in enforcing turbine wheel rotation and the balance of the combustion products is issued through the rear jet orifice end of the housing as at 46 as a propulsive jet.

Between the jet orifice 46 and the turbine wheel, a truncated conical tail element 48 is secured, which defines with the housing 16 an annular conical passage 50 through which the combustion gas passes from the turbine blades 42 to the jet orifice. Within the space defined by the truncated cone 48, is disposed a rocket motor 52 comprising a combustion chamber 54, a venturi 55 and a rearwardly facing jet 56 which is concentric with the jet orifice 46. Upon issue of propulsive gases from the rocket motor 52, the thrust of the rocket motor will augment the thrust created by the operating turbo-jet engine. The combined jets of the engine and the rocket motor will be coaxial and will be rearwardly directed to produce aircraft propulsive thrust.

The combustion chamber 54 of the rocket motor is fed with fuel and oxidizer through pipes 58 and 60 leading from the outlets of pumps 62 and 64 respectively and may include an igniter 65. The pumps are fed respectively by pipes 66 and 68 leading through remotely controllable valves 70 and 72 to tanks 74 and 76, one of the tanks carrying fuel and the other oxidizer. Typical of these are gasoline and liquid oxygen but any suitable materials may be used including monofuels incorporating the fuel and oxidizer in a single material. The tanks may be mounted within the confines of the aircraft as in the illustration or may be carried exteriorly of the aircraft for jettisoning after they are exhausted. The disposition of the tanks is not a matter of concern in this invention since they will be located by the aircraft designers in such fashion as to best accomplish the purpose for which the aircraft is to be used.

The pumps 62 and 64 of any appropriate type such for instance, as centrifugal, are drivably connected to the turbo-jet engine shaft 26 through a clutch and gear unit 80. This unit preferably is remotely controllable in order that the pumps may be drivably engaged with the turbine shaft when it is desired to secure the extra thrust to be afforded by operation of the rocket motor. Remote control for the pump clutch operation is indicated by the line 82 leading to an air crew control unit 84.

Remote control of the fuel and oxidizer valves 70 and 72 is indicated by the lines 86 and 88 respectively connected to air crew operating mechanism 90 and 92.

The specific details of control for the rocket motor and for the fuel and oxidizer pumps do not comprise a detailed part of the invention—any appropriate mechanisms known in the art may be employed.

Only a small part of the shaft horsepower available in the shaft 26 is required for driving fuel and oxidizer pumps of the rocket motor.

For aircraft take-off, if the turbo-jet engine has been started, the rocket motor may be energized and the combined thrust of the turbo-jet engine of the rocket motor may be utilized for take-off. Upon completion of take-off, the thrust augmentation secured from the rocket motor may no longer be needed so the fuel and oxidizer may be turned off and the pumps 62 and 64 disconnected whereupon sustained flight can be maintained by the turbo-jet engine. Should super performance be required by the aircraft, as in certain kinds of military maneuvers, the rocket motor may be turned on and operated at will during flight.

The provisions of this invention are also applicable to gas turbines driving propellers as indicated in Fig. 2 of the drawings. Such engines are generally similar to turbo-jet engines but part of the energy of the combustion gases is utilized in driving the propeller in addition to driving the engine compressor. I have indicated a reduction gear 94 driven by the turbine shaft 26, the reduction gear in turn driving a propeller 96 through a shaft 98. The propeller may be of any appropriate type.

While I show the engine combination of the invention as one of possibly two such units laterally spaced from the axis of symmetry of an aircraft, it is clear that a greater plurality of such engines might be utilized in an aircraft or that a single combined engine might be used. If the single engine unit were used, it would preferably be disposed on the axis of the aircraft and suitable provisions would be made for securing jet thrust reaction to drive the airplane without interference by aircraft structure.

The details of construction of the turbo-jet engine or the gas turbine are not part of this invention per se. The configuration of the engine shown in the drawings is merely exemplary of the general engine type and no limitation is to be implied by the specific showing with respect to the scope of the invention except as respects the coaxial disposition of the rocket motor thrust line with respect to the line of thrust resulting from operation of the turbo-jet engine. In this connection, if the combustion gases from a turbo-jet engine are carried through ducts to a point of issue remote from the engine itself as in Fig. 3, it would be preferable to dispose the rocket motor 52 in the turbo-jet engine orifice while the pumps 62 and 64 would be disposed adjacent the turbo-jet engine, the pipes 58 and 60 for conducting fuel and oxidizer from the pumps to the rocket motor being led through the aircraft structure in an appropriate manner.

It is to be understood that the invention may be applied in various forms other than the ones specifically disclosed. Changes may be made in the arrangements shown without departing from the spirit or scope of the invention as will be apparent to those skilled in the art and reference should be made to the appended claims for a definition of the limits of the invention.

What is claimed is:

1. In an aircraft, a gas turbine having a truncated tailcone over which turbine effluent flows, the small end of said truncated tailcone being open and directed rearwardly, and a rocket motor within said truncated tailcone and issuing its effluent through the rearward open small end thereof, said rocket motor having selectively operable liquid fuel and liquid oxidizer feed mechanisms driven by said gas turbine and disposed within said tailcone and forward of said rocket motor.

2. In an internal combustion turbine power plant comprising a rotor and a turbine wheel toward an end thereof, a truncated cone masking the central part of said wheel extending downstream therefrom with respect to gas flow through said turbine, a pump housed by said cone and driven by said rotor, a combustion chamber having an open end defining substantially the downstream end of said cone, and means connecting the pump exit with said combustion chamber.

3. In an internal combustion power plant comprising fuel and air burning means, a turbine driven by the combustion products from said means, and a jet tailpipe leading downstream from said turbine, a rocket combustion chamber within said jet tailpipe, fuel and oxidizer supplies for said chamber, and pumps connected to said supplies, feeding said combustion chamber, and driven by said turbine, said pumps being disposed in said jet tailpipe between said turbine and chamber.

4. In an internal combustion power plant comprising fuel and air burning means, a turbine driven by the combustion products from said means, and a jet tailpipe leading downstream from said turbine, a rocket combustion chamber within said jet tailpipe, fuel and oxidizer supplies for said chamber, pumps connected to said supplies, feeding said combustion chamber, and driven by said turbine, and a housing embracing said pumps and chamber over the exterior surface of which the effluent from said turbine flows.

5. In an aircraft power plant in combination, a rotor having a compressor and a turbine thereon, a combustion chamber between the compressor and turbine for receiving air from the compressor and discharging gases to the turbine for driving it, a tailcone extending rearwardly from said turbine over the exterior surface of which said gases pass from the turbine, said tailcone having an open rear end, a pump disposed within said tailcone driven by said rotor, and a rocket chamber within said tailcone exhausting through its rear opening, said pump delivering fuel to said rocket chamber.

6. In aircraft, an air consuming compression-expansion jet producing power plant operable independently of aircraft speed, including a turbine driven by power plant working fluid, said working fluid including expanded air, and a tailpipe through which said working fluid issues to the atmosphere; a tailcone within said tailpipe and defining with said tailpipe an axially extended annular passage for said working fluid, said tailcone being open at its rearward end, a rocket combustion chamber within said tailcone having a jet nozzle directing rocket combustion products through the open end of said tailcone and in the direction of efflux of the power plant working fluid, means to feed combustible expandible fuel to said rocket combustion chamber, and a selectively operable driving connection between the turbine of said power plant and said rocket fuel feeding means, said feeding means being disposed, with said rocket combustion chamber, within said tailcone.

References Cited in the file of this patent

UNITED STATES PATENTS

| | | |
|---|---|---|
| 2,407,852 | Smith | Sept. 17, 1946 |
| 2,409,177 | Allen | Oct. 15, 1946 |
| 2,411,552 | New | Nov. 26, 1946 |
| 2,419,866 | Wilson | Apr. 29, 1947 |
| 2,435,836 | Johnson | Feb. 10, 1948 |
| 2,479,777 | Price | Aug. 23, 1949 |
| 2,531,761 | Zucrow | Nov. 28, 1950 |

FOREIGN PATENTS

| | | |
|---|---|---|
| 321,933 | Great Britain | Nov. 19, 1929 |
| 574,873 | Great Britain | Jan. 24, 1946 |
| 522,163 | France | Mar. 22, 1921 |